April 20, 1965  A. I. McFARLAN  3,179,162
AIR-CONDITIONING SYSTEM AND METHOD
Filed Nov. 28, 1962  3 Sheets-Sheet 1

INVENTOR.
ALDEN I. McFARLAN
BY
Curtis, Morris & Safford
ATTORNEYS

April 20, 1965     A. I. McFARLAN     3,179,162

AIR-CONDITIONING SYSTEM AND METHOD

Filed Nov. 28, 1962     3 Sheets-Sheet 2

INVENTOR.
ALDEN I. McFARLAN

BY

Curtis, Morris & Safford
ATTORNEYS

FIG. 7

INVENTOR.
ALDEN I. McFARLAN
BY
Curtis, Morris & Safford
ATTORNEYS

United States Patent Office 3,179,162
Patented Apr. 20, 1965

3,179,162
AIR-CONDITIONING SYSTEM AND METHOD
Alden I. McFarlan, 691 Dorian Road, Westfield, N.J.
Filed Nov. 28, 1962, Ser. No. 240,484
16 Claims. (Cl. 165—2)

This invention relates to air conditioning, and more particularly to air conditioning multi-room buildings having different air-conditioning requirements in the different areas.

Many modern buildings are of a type having an inner core space and an outer peripheral area separated by walls. Due to the lights and accessory equipment used in such buildings, the inner core space may require cooling the year around while the load on the peripheral space may change at different seasons and may even change from heating to cooling, and vice versa, during the same day. For example, the east side of a building may require cooling in the morning while the west side requires heating, but in the afternoon the situation may be completely reversed so that the east side requires heating while the west side requires cooling.

Because of the different conditions in the central core and outer peripheral spaces of buildings and because of the separation of the areas by walls, it is the common practice to provide separate air distribution systems for the different areas. For example, outside air, or usually a mixture of outside and recirculated air, is de-humidified and cooled or heated for the particular conditions desired before it is delivered to the central core and peripheral spaces, respectively.

Multi-room buildings of the type indicated are often air conditioned by air induction or fan coil units located in the different rooms or spaces. Both air induction and fan coil units are quite expensive, and they require costly installation piping and connections and are expensive to operate and maintain. Furthermore, when fan coil units are used they present a problem of adequate ventilation and smoke dilution unless openings are provided in the walls of the building, and such openings have the disadvantages of permitting the entry of outside air which brings in dirt and is cold when heating is required and hot when cooling is required.

An object of this invention is to provide air-conditioning systems and methods which overcome the difficulties which have been encountered in the past.

Another object is to provide an air-conditioning system which utilizes the conditioned air from the inner core space of a building to ventilate the outer peripheral areas of the building.

Another object is to provide air-conditioning systems of the type indicated which utilize the heat from the central core portions of the buildings to at least partially heat the outer peripheral areas whenever such heating is required.

Another object is to provide an air-conditioning system of the type indicated for air conditioning the peripheral areas of a building without the use of expensive primary air risers and ducts required in conventional air induction systems.

Another object is to provide novel component units for air conditioning areas of a building in accordance with the present invention.

Still another object of the invention is to provide air-conditioning systems for buildings of the type indicated which are more economical to install and to operate than conventional air-conditioning systems, which may utilize outside air to cool and ventilate the inner core areas, which utilize heat absorbed in cooling one part of the building to heat other parts of the building, and which are reliable in operation to maintain comfort conditions in all parts of the building during all seasons of the year.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 7 is a diagrammatic view of the elements of a system generally similar to that shown in FIGURE 2 to more clearly illustrate the fluid circuits connecting the elements.

In carrying out the present invention in the illustrative embodiments, down-draft air-conditioning units are provided for the outer peripheral spaces in a building which receive air from above the ceiling and deliver it at spaced points along the base of the outside wall or walls of the space. The air distributing system for a building utilizes the space over the entire area between a false ceiling and the floor above for the flow of air from the inner core into the outer peripheral areas by convection.

Figure 1:
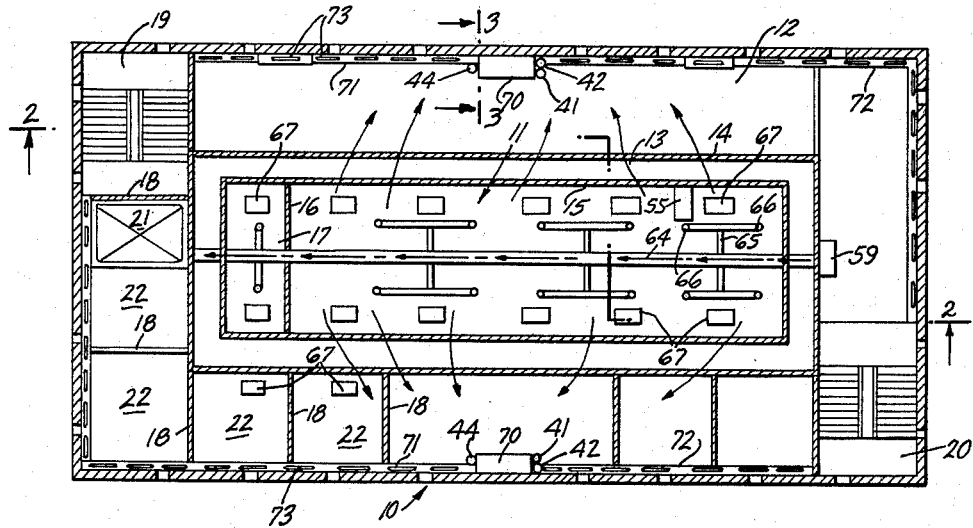
FIGURE 1 is a somewhat schematic sectional plan view of one floor of a building having a central core and peripheral areas separated by walls and showing an air-conditioning system of the present invention applied thereto.

Referring now to FIGURE 1 of the drawings, an air-conditioning system incorporating the present invention is shown installed in a building 10 in which each floor has a central core space 11 and an outer peripheral space 12. In the illustrated embodiment, the central core space 11 is separated from the peripheral space 12 by a corridor 13 having walls 14 and 15 at each side, but it will be understood that the core and peripheral spaces may be divided in other ways. The inner core space 11 is divided by partition walls 16 to form separate rooms, one such room 17 being illustrated, and the outer peripheral space is divided by partitions 18 to form separate spaces or rooms 22. Stairwells 19 and 20 are located at opposite corners of the building and an elevator well 21 is illustrated at one end thereof. As shown more clearly in FIGURE 2, the partition walls 14 and 15 extend only to a false ceiling 25 which provides an open space 26 between the false ceiling and the bottom of the floor 27 above and this open space extends over both the inner core space 11 and outer peripheral space 12 on each floor, for a purpose as later explained in detail.

The apparatus for heating and cooling the building 10 may be located at any suitable place such as in the basement or on the roof. However, in this embodiment (FIGURES 2 and 7), this apparatus is on the roof in a penthouse 30 and includes a refrigeration system 31 for supplying separate streams of hot water and chilled water, there being a water heater 32 such as a steam converter for supplying hot water when the supply of hot water from the refrigeration system is inadequate. There is also a heat exchanger 33 for delivering conditioned air to the inner core space 11, and a cooling tower 34 for cooling water and transferring heat to the atmosphere whenever the amount of heat available from the refrigeration system is in excess of that required for heating the peripheral areas.

The refrigeration system 31 comprises a compressor 35 connected by a line 36 to a condenser 37 where refrigerant vapor is condensed to a liquid. Liquid refrigerant flows from condenser 37 to an evaporator 38 through a line having an expansion valve 39. Refrigerant vapor then returns from evaporator 38 to compressor 35 through a line 40. Condenser 37 and evaporator 38 are both of the shell and tube type with the water flowing through the tubes and with refrigerant in the shell surrounding the tubes. Condenser 37 is a special double condenser in that two separate water circuits are provided and the refrigerant is cooled and condensed by water flowing through either of the circuits. Accordingly, each of the water headers at the ends of the water tubes is divided into two separate header sections. In this way there are two nests of tubes to which the separate streams of water may be supplied. One nest of tubes and the two connecting headers are connected into a closed heating circuit, whereas the other nest of tubes and the connecting headers are connected into the circuit of cooling tower 34. When it is desirable to provide cooling of the refrigerant using the cooling tower circuit, water is circulated through the upper portion of the condenser into the cooling tower. When heat from the condenser is used to heat the building, water is circulated through the closed circuit. To this end, a branch hot water line 43 extends from condenser 37 to water heater 32 and from which a hot water line 41 extends downwardly through the various floors of the building 10, and a chilled water line 42 extends from evaporator 38 adjacent line 41. These lines supply hot or chilled water to various air-conditioning units throughout the building, later to be described. A common return line 44 is connected to a pump 45 for delivering return water to both condenser 37 and evaporator 38 to complete the circuit.

Cooling tower 34 supplies cooled water to condenser 37 when there is no heating load in the building. To this end, a line 46 is connected from the upper part of condenser 37 to the nozzles 47 of the cooling tower 34, and a line connects the sump of the cooling tower to a pump 48 which delivers cooled water back through the condenser 37. Pump 48 is controlled to circulate cooling water through the cooling tower 34 and dissipate heat to the atmosphere when the cooling load on the building exceeds the heating load. Separate open and closed circuits have been described for passing separate streams through separate sections of a double condenser 37, but it will be understood that conditions may warrant the use of the same water in the heating circuit as in the cooling tower circuit, using a single circuit condenser either in an open circuit or in a closed circuit having a coil in the cooling tower 34 externally cooled by evaporative cooling. As thus far described, the heating and cooling system is generally similar to that described and claimed in my prior Patent No. 2,796,740, issued June 25, 1957, and directed to my "Three-Pipe" system.

Figure 2:
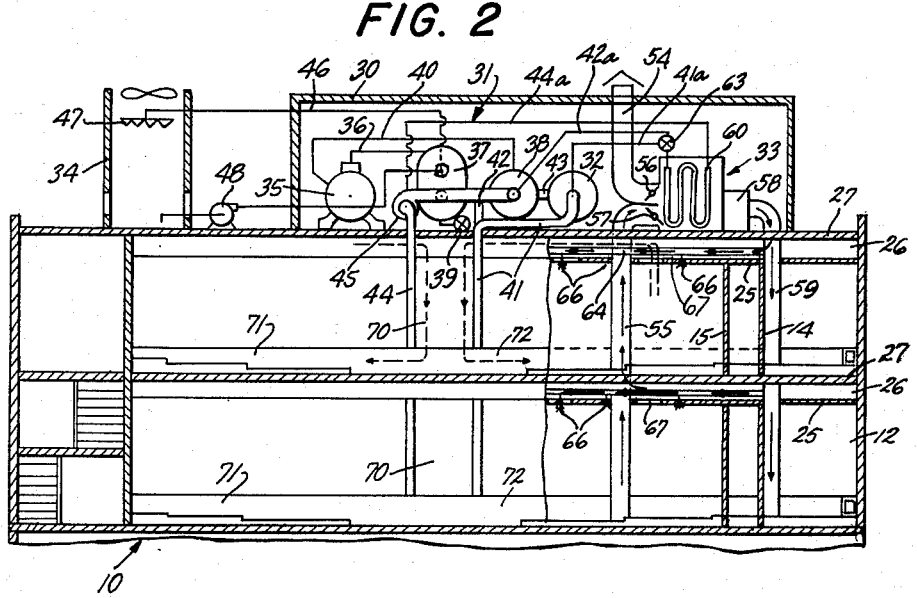
FIGURE 2 is a sectional side elevational view of the building on line 2—2 of FIGURE 1, showing the air distributing system for delivering air from the central core area to the peripheral areas.

In accordance with the present invention, the same air used to ventilate and air condition the inner core space 11 is used to ventilate and air condition the peripheral area of the building. A constant volume of air is supplied to the core space 11 containing, for example, 25% outside air for ventilating the space and 75% return or recirculated air. To this end, outside air is delivered to the heat exchange unit 33 through a conduit 54 and return air is supplied to the unit through a conduit 55. Conduit 54 extends from outside the penthouse 30 and the return air duct 55 extends upwardly through the entire building. As shown in FIGURES 1 and 2, the return air duct 55 extends through the inner core space 11 and has exhaust opening in core spaces 11 or mixing spaces 26 of different floors and suitable restrictive dampers (not shown) to control the flow of return air uniformly from different areas of the building. Conduits 54 and 55 have control louvers 56 and 57, respectively, which control the proportions of outside and return air and fix the constant volume of air supplied to the inner core space 11. This air first flows through heat exchange unit 33 and is then delivered by a fan 58 to a supply conduit 59 extending vertically through the building to deliver primary air to the core space on each floor. Heat exchange unit 33 has a heat exchange coil 60 for contacting the air as it passes therethrough. As stated above, the inner core space 11 usually requires cooling the year around so that the air is cooled by coil 60 during most periods of the year. However, either hot or chilled water or a mixture at the desired temperature may be supplied to coil 60 through the auxiliary lines 41a and 42a from hot and cold water lines 41 and 42, respectively, under the control of a valve 63. Water from the heat exchange coil 60 passes to pump 45 through an auxiliary line 44a of common return line 44.

Air from the heat exchange unit 33 is delivered by fan 58 through conduit 59 to an air distributing means for each floor comprising a horizontal conduit 64 which extends through the core space 11 in the space 26 above the ceiling 25 and has a series of T-shape branches 65 (see FIGURE 1) at spaced intervals with diffusing outlets 66 at the ends of the branches. Branches 65 are so arranged as to position the diffusing outlets 66 in a predetermined geometric pattern to deliver air at spaced points over the entire core space. As shown in FIGURE 2, the diffusing outlets 66 extend through and depend below the false ceiling 25. In addition to the diffusing outlet 66, the false ceiling 25 has a series of spaced openings, such as registers 67, through which heated air may rise from the core space below the false ceiling to the open space 26 above.

Figure 3:
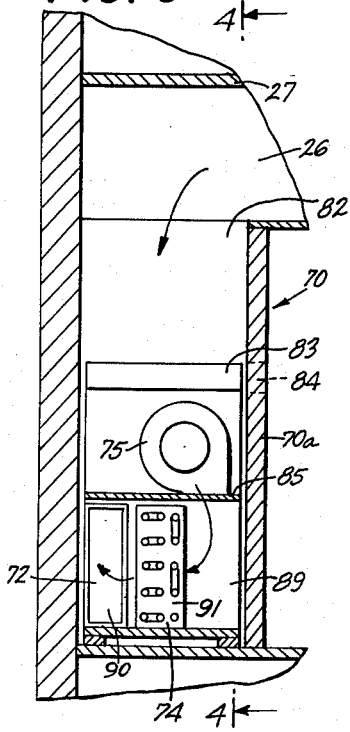
FIGURE 3 is a sectional view on line 3—3 of FIGURE 1 and showing a down-draft air-conditioning unit of the present invention on one side wall of the peripheral space.

Warm air from the open space 26 is drawn into the top of one or a plurality of down-draft conditioning units 70 shown in detail in FIGURE 3 and each operates to recondition the air and deliver it to the outer peripheral space 12 of the building. Each down-draft unit 70 comprises a vertical conduit 70a having an open upper end in communication with the space 26 and extending downwardly along an outside wall of the building and above each floor it opens into a pair of laterally extending conduits 71 and 72 extending along the wall above the floor. As shown in FIGURE 1, a down-draft unit 70 is provided on each of the opposite walls of the building, and the laterally extending conduits 71 and 72 have restrictive outlet openings 73 for delivering the air into different areas of the outer peripheral space.

As shown best in FIGURE 3, each down-draft unit 70 has a heat exchange coil 74 and a fan 75 for circulating air in a path through the lateral conduits 71 or 72 and into a room or area (see also FIGURE 6) in the peripheral space 12. Air from space 12 then flows upwardly through openings 67 in the false ceiling 25 and back to the space 26. Thus, conditioned air supplied to the core space 11 is used to ventilate as well as air condition the outer peripheral space 12. Each of coils 74 is supplied with either chilled water from the line 42 or hot water from the line 41 or a mixture of hot and chilled water as controlled by a valve 77, which is the same as valve 63 of coil 33. Water from each of the coils 74 is delivered to the common return pipe 44 and thence through pump 45 to the inlet to the condenser 37 and evaporator 38. Hence, each coil 74 has a constant supply of hot or chilled water and the return water flows from the coil through return line 44. Water heater 32 contains a steam coil 78 and which is supplied with steam under the control of a valve 79.

Each down-draft conditioning unit 70 (see FIGURES 3 and 4) has a filter 83 extending across conduit 70a which may be inserted and removed through a suitable opening 84 in one of the walls. Underlying filter 83 is a platform 85 extending across the conduit and connected to its walls to form a closure. The platform 85, in turn, mounts a motor-fan unit illustrated as comprising two fans 75 and 75a and a driving motor 86. Fans 75 and 75a are preferably of the centrifugal type having axial inlet openings and a peripheral outlet overlying suitable openings in the platform 85. The space below the platform 85 is divided into a forward inlet plenum chamber 89, a space in which the heat transfer coil 74 is mounted, and an outlet plenum chamber or a distributing space 90 at the rear of the coil communicating with the ends of the lateral conduits 71 and 72. Coil 74 extends throughout the width of the down-draft unit and has a series of spaced fins 91 which divide and direct the air rearwardly through the coil 74. Thus, air from the space 26 is circulated by fans 75 and 75a through filters 83 and coil 74 and is then delivered through the lateral conduits 71 and 72 and the restricted openings 73 into the outer peripheral space.

Figure 4:
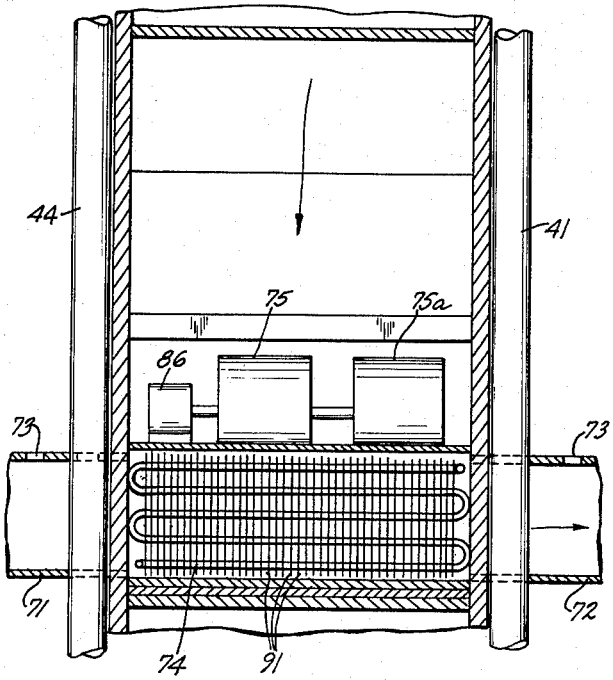
FIGURE 4 is a sectional view on line 4—4 of FIGURE 3, showing the arrangement of the fans and heat transfer coil of the down-draft air-conditioning unit as well as the laterally extending ducts having restrictive openings therealong.
Figure 5:
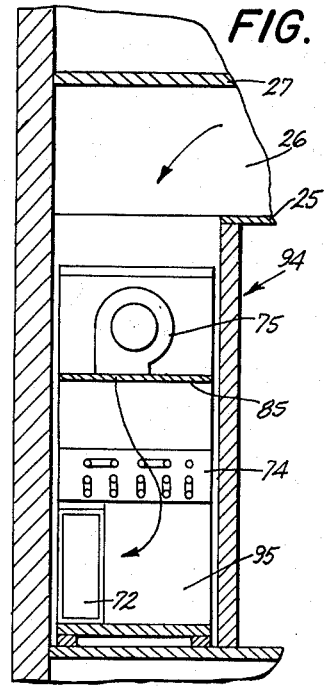
FIGURE 5 is a sectional view similar to FIGURE 3 showing a down-draft air-conditioning unit of modified construction.

A down-draft unit 94 of modified construction is illustrated in FIGURE 5 which is generally similar to that of FIGURES 3 and 4, except that the heat exchange coil 74 is arranged horizontally instead of vertically. Coil 74 is located above the lateral conduits 71 and 72 and provides a larger plenum chamber or space 95 between the lateral conduits for distribution of air. Platform 85 and fans 75 are identical with those of FIGURE 3 except that they are located at a higher level in the down-draft conduit.

Figure 7:
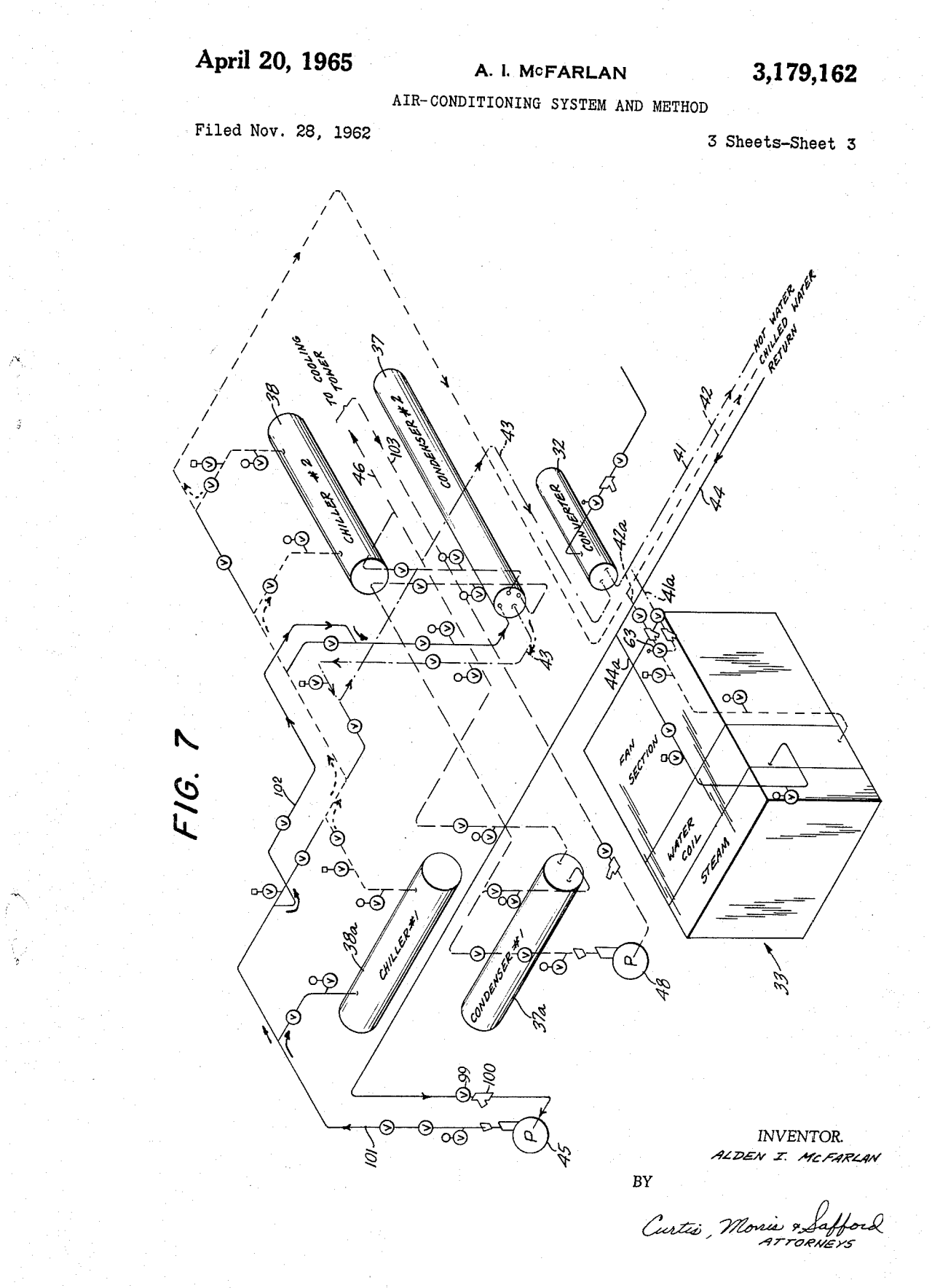

FIGURE 7 is a schematic view of the hot and chilled water circuits and cooling circuit, but without the refrigerant circuit, to more clearly illustrate the lines and connections. To differentiate the different circuits, the line in which hot water occurs is shown in dot and dash lines, the line where chilled water occurs as dotted lines, the common return as full lines and the cooling tower circuit as dash lines. For example, water returns from the various air conditioning units on different floors through the line 44 and is delivered through a suitable gate valve 99 and the strainer 100 to pump 45. Pump 45 delivers the water through a line 101 to one of the evaporator chillers 38 or 38a as controlled by valves, or through both of the evaporator-chillers in series. A branch 102 delivers water from line 101 to one of the condensers 37 and then from the condenser through line 43 and converter 32 to hot water line 41. In the embodiment illustrated in FIGURE 7, the condenser 37 is a double path type having one path therethrough for supplying hot water to heat the building, and another path for delivering hot water to the cooling tower to dissipate heat from the building. The particular type of condenser 37 illustrated in FIGURE 7 has tubes with return bends to provide a double pass so that water is received and delivered from the same end.

In FIGURE 7, a line 103 from the cooling tower leads to pump 48 which, in turn, delivers the water to one or both condensers 37 and 37a. The lines have valves and by-passes so that either condenser may be connected in the cooling tower circuit singly or both may be connected in the circuit in parallel. The water leaving the condenser or condensers 37 and 37a is delivered through line 46 back to the cooling tower 34. The invention having now been described in detail the mode of operation is explained below.

For purposes of description, let it be assumed that the inner core space 11 produces more heat than passes outwardly through the walls so that it constitutes a cooling load the year around. Also, assume that the load in the outer peripheral space 12 varies from heating to cooling at different seasons of the year and during some seasons requires heating and cooling during the same day. Let it further be assumed first that the air-conditioning system is operating during the winter months.

Under winter operating conditions 50% outside air and 50% return air is drawn into the air-conditioning unit 33 through the conduits 54 and 55 to produce a 25% fresh air to 75% return air ratio in the overall air volume in the building, and the air is directed through coil 69 and main vertical conduit 59. Air from the main conduit 59 is then delivered through the auxiliary conduit 64 for a particular floor and through the diffusing outlets 66 into the core space 11. When the temperature of the outside air is sufficiently low so that the 50% outside make-up portion, required for ventilation, will absorb all the heat generated in the core space 11 by lights and accessories, no refrigeration is required. The heated air in the core space rises and exhausts through the openings 67 through the false ceiling 25 into the open space 26 between the ceiling and bottom of the floor 27 above. The air passes to the peripheral spaces through the various down-draft units 70 and within each unit the stream of air is subjected to the heating necessary to maintain its space at the proper temperature. A more usual situation in the less cold winter periods, and during the spring and fall, is one in which the air supplied to the inner core space 11 is cooled to the required temperature and humidity to produce comfort conditions for people who occupy the space. The system then operates to transfer heat picked up from the inner core space 11 by the chilled water in the cold water line to the water in the hot water line through the refrigeration system.

Figure 6:
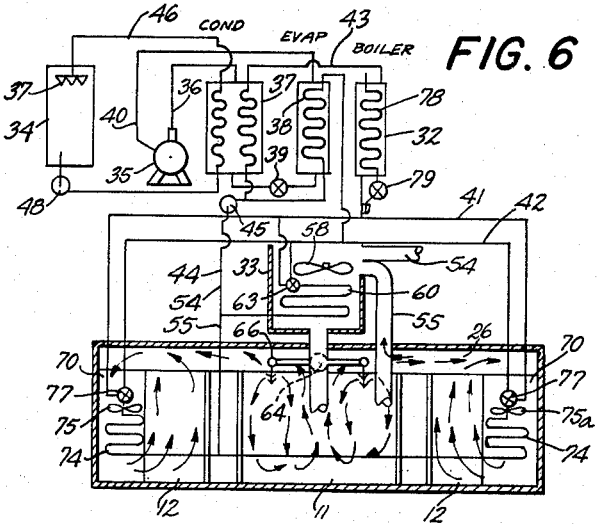
FIGURE 6 is a diagrammatic view of the air distributing and refrigerant circuits of the improved system of the present invention as applied to one floor of a building.

The air exhausting from the core space 11 into the open space 26 through openings 67 in ceiling 25 and containing the heat absorbed in the core space is then delivered through the down-draft units 70 for ventilating and air conditioning the outer peripheral space 12. To this end, the fans 87 and 88 (see FIGURES 3 to 6), driven by motor 86, in each down-draft unit 70 draw air from the space 26 and move it downwardly into the plenum chamber 89 (FIGURE 3) and thence rearwardly through coil 74 into the plenum chamber 90 to the lateral conduits 71 and 72. During winter operation, if the air from space 26 does not contain sufficient heat to produce comfort conditions in the outer peripheral space, additional heat is supplied by passing hot water through coil 74 under the control of valve 77. The air flows through the lateral conduits 71 and 72 at the base of the outside wall and is delivered therefrom through the restrictive outlet openings 73 at spaced points therealong into the outer peripheral space 12. The outlets 73 may correspond to rooms or areas and each may be controlled as, for example, by a volume control as described and claimed in my prior Patent 2,885,867, issued May 12, 1959. Air passes from the peripheral space 12 through openings 67 back into the space 26 above the false ceiling 25 where it intermingles with the air flowing from the core space 11. Some of this intermingled air is recirculated through the down-draft units 70 to the peripheral spaces 12. However, as best shown in FIGURE 6 some air is discharged from each of the spaces 26 through the conduit 55 back to unit 33. The amount of such air withdrawn from each space 26 is controlled by relative settings of dampers 56 and 57 and by dampers at the various discharge openings from the spaces 26. Hence, a predetermined volume of air is withdrawn from the peripheral spaces and utilized as part of the primary air which is delivered to the core space 11 through conduit 59. The remaining quantity of the primary air is outside air drawn in through conduit 54 and an amount equal to this is vented from the air conditioned spaces. Such venting is insured by a slightly elevated pressure condition and is by leakage from windows, doors, and other passageways as well as from vents through toilets, etc. However, under some circumstances special exhaust vents are provided. The constant circulation of air throughout the air conditioned spaces and the constant venting maintains an acceptable level of smoke and other odors. It is thus seen that the heat of the core space 11 is utilized directly to raise the temperature of the primary air passing to the peripheral spaces. Hence, a single source of primary air is used for the core spaces which require a relatively low temperature primary air and to the peripheral spaces which require a slightly higher primary air temperature when the outside temperature makes that desirable. At the same time, the refrigration system removes the heat from the water which is used to cool the air for the core spaces 11 and delivers this heat to the water which flows through the coils 74 in units 70 to supply the additional heat to the peripheral spaces. Also, the system is automatic in supplying each of the units 70 with water at the temperature necessary to maintain its peripheral space at the desired temperature. Hence, one coil 74 may be receiving hot water while the coil 74 in another unit 70 may be receiving chilled water.

Referring to FIGURES 2 and 6, compressor 35 supplies refrigerant gas at a relatively high pressure and temperature to condenser 37 and the heat of compression is transferred to the water flowing through the lower section thereof to condense the refrigerant. This provides hot water in the hot water line 41, and when desirable additional heat is supplied to the water in water heater 32. Condensed refrigerant flows through the expansion valve 39 into the evaporator 38 where the liquid refrigerant is evaporated at a low pressure and temperature, due to the action of compressor 35, to absorb heat from the water flowing therethrough and thereby supply chilled water to the chilled water line 42. Hot or chilled water or a mixture thereof is supplied to coils 60 and 74 of the air-conditioning units 33 and 70 under control of the respective valves 63 and 77 in accordance with requirements. When the entire load is a cooling load the cooling tower pump 48 (FIGURE 2) is operated to deliver water from the hot water line 41 through line 46 to cooling tower 34 to dissipate the heat from the building to the outside atmosphere. When the heating load exceeds the capacity of the condenser 37, additional heat is supplied to the water by water heater 32 connected in series with the condenser.

During summer operaton, the system operates as explained above with respect to winter operation except that cooling is usually required to air condition the outer peripheral space 12 as well as the inner core space 11. However, the same air is cooled in two successive steps instead of providing two separate streams of air for the core and peripheral spaces. Under these operating conditions the control valves 63 and 77 are set to deliver chilled water to the coils 60 and 74 of all of the air-conditioning units 33 and 70 and the cooling tower pump 48 circulates cooling water from condenser 37 to cooling tower 34 to dissipate heat from the building to the atmosphere.

During operation of the system in the spring and fall months, the air supplied to the inner core space 11 will require some cooling and the outer peripheral space 12 may require some heating during at least certain periods of the day. The heat absorbed in the inner core space is utilized to heat the outer peripheral space to reduce the cost of heating. The system of the present invention operates both directly and indirectly to utilize the heat picked up in one part of the building to heat other parts of the building. Heat is transferred directly to temper the air delivered to the peripheral spaces by mixing the air from the core space 11 with the air from the outer peripheral space 12 in the space 26 for circulation by units 70. In addition, heat absorbed in the water in the coils 60 and 74 of units 33 and 70 is transferred by the refrigeration system to the water in hot water line 42. With the improved system of the present invention, the cooling and heating required in the core and peripheral spaces can be supplied at less cost than the cost of steam for heating alone. For example, if the core space 11 requires 100 tons of refrigeration corresponding to a 1,200,000 B.t.u. heat transfer per hour, this refrigeration can be produced with a 60 H.P. motor requiring 53 kw. which costs 77¢ per hour at a rate of 1½¢ per kwh. This 1,200,000 B.t.u.'s is then available in the condenser to heat the peripheral space. The cost of steam to produce 1,200,000 B.t.u. would cost $2.22 in New York City. Thus, the system of the present invention will produce a saving of $1.45 per 1,200,000 B.t.u. of heating Actually, the saving is greater as more heat is available from the 53 kw. per hour than the 1,200,000 B.t.u. referred to.

It will now be observed that the present invention provides an air-conditioning system which utilizes air from the inner core space of a building to ventilate the outer peripheral areas of the building. It also will be observed that the air-conditioning system of the present invention utilizes heat from the central core area of the building and false ceiling to at least partially heat the outer peripheral areas of the building during certain seasons of the year when the peripheral area of the building is a heating load. It will further be observed that the present invention provides down-draft air-conditioning units for the outer peripheral spaces in a building which receives air from a space between a false ceiling and floor above and delivers it at spaced points along the base of an outside wall for flow upwardly along the wall and across the windows where heat enters the space. It will still further be observed that the present invention provides an air-conditioning system which may be installed in a building and operated more economically than conventional air-conditioning systems, which may utilize outside air to cool and ventilate the inner core area, which utilizes heat absorbed in the inner core space of the building to heat the outer peripheral space during certain seasons, and a system which is reliable in operation to maintain comfort conditions in all parts of the building during all seasons of the year.

While a single embodiment of the invention is herein illustrated and described, it will be understood that changes may be made in the construction and arrangement of elements without departing from the spirit or scope of the invention. For example, in place of the fans 75 and 75a in the down-draft units 70, nozzle type air induction type units could be mounted in the ducts 70a to direct jets of primary air downwardly therethrough and induce the flow of air from the inner core and outer peripheral spaces from either directly through the space above the false ceiling, or through separate ducts to the outer peripheral space. Therefore, without limitation in this respect the invention is defined by the following claims.

I claim:

1. The method of air conditioning a building having an inner core space for occupancy by people and in which lighting and other accessory equipment and machines may exist creating a cooling load and an outer peripheral space creating both cooling and heating loads at different seasons of the year which comprises, supplying air to the inner core space including outside air to ventilate the space, cooling the air supplied to the inner core space when necessary to maintain the required temperature and humidity producing comfort conditions in said inner core space, absorbing the heat of said inner core space in said air and then exhausting the air from said space, and then circulating the heated air exhausted from said inner core space in the outer peripheral space to utilize the heat absorbed in the inner core space to at least partially heat the outer peripheral space.

2. The method of air conditioning in accordance with claim 1 in which the air for the inner core space is cooled by transfer of heat to a circulating fluid and the air in the outer peripheral space is heated by transfer of heat from a circulating fluid, and transferring the heat in the fluid absorbed from the air in the inner core space to heat the outer peripheral space.

3. The method of air conditioning a building in accordance with claim 2 which comprises dividing the heating and cooling fluids into separate streams, transferring the heat from the heating fluid in one stream to the evaporator of a refrigeration system to chill the fluid in said one stream, and transferring the heat from the condenser of said refrigeration system to the fluid in the other stream to heat the fluid.

4. In an air-conditioning system including a building having an inner core space for occupancy by people and an outer peripheral space surrounding the inner core space and also adapted for occupancy by people, means for supplying conditioned air to the inner core space, a duct extending downwardly in the peripheral space from the top to the bottom thereof, means for delivering air from the top of said inner core space to the upper end of said duct, a heat transfer coil in said duct, means for supplying a heat transfer medium to said coil, and means for circulating air from the upper end of said duct downwardly therethrough into the peripheral space.

5. In an air-conditioning system including a building having an inner core space with at least one enclosure for occupancy by people and an outer peripheral space surrounding the inner core space and separated therefrom, a false ceiling extending over both the inner core and outer peripheral spaces to provide an open area common to both spaces, a vertical duct extending from the false ceiling downwardly along one side wall of the outer peripheral space, a horizontal duct extending from at least one side of the vertical duct along the peripheral space, a heat transfer coil in said ducts, a fan for circulating air from the space above the false ceiling through the downwardly extending duct and laterally along the horizontal duct extending from one side thereof, and said horizontal duct having restrictive openings therein at spaced intervals therealong for delivering air conditioned by the heat transfer coil into the space.

6. In an air-conditioning system including a space having a plurality of peripheral rooms with different air conditioning requirements and a false ceiling overlying the space, a vertical duct extending from the false ceiling downwardly along one side wall, horizontal ducts extending laterally from the vertical duct along the side wall and through the peripheral rooms, a heat transfer coil in the vertical duct, means for supplying a heat transfer medium to the coil to heat and cool as required, a fan in the vertical duct for circulating air from said space above the false ceiling downwardly through the vertical duct and laterally along the horizontal ducts, said horizontal ducts having restrictive openings therein for delivering air treated by the heat transfer coil into the peripheral rooms, and openings in the false ceiling through which air exhausts from the different rooms and mixes with air in the space above the false ceiling for circulation through the vertical duct by said fan therein.

7. In an air-conditioning system including a space having a central core area with at least one enclosure for occupancy by people and creating a cooling load and separated by walls from a peripheral area with at least one enclosure creating heating and cooling loads at different seasons and a perforate false ceiling overlying both areas, said air-conditioning system comprising means for delivering at least some outside air into the central core area, means for cooling said air when required to maintain the required temperature and humidity for comfort conditions in said central core area, outlet openings in the false ceiling through which air from the central core area may flow into the space above the false ceiling, an air-conditioning unit having a vertical duct extending downwardly from the false ceiling along a side wall of the peripheral space, at least one horizontal duct extending laterally from the vertical duct along the base of the side wall and through the peripheral area, a heat transfer coil in one of said ducts, means for supplying a heat transfer medium to said coil, a fan for circulating air from the space above the false ceiling through the outer peripheral space by first directing it downwardly through the vertical duct and into contact with the heat transfer coil and then laterally along the horizontal duct, and said horizontal duct having restrictive openings therein at spaced intervals therealong for delivering air conditioned by the heat transfer coil into the peripheral rooms.

8. An air-conditioning system in accordance with claim 7 in which the means for supplying a heat transfer medium to the heat transfer coil comprises a refrigeration system for delivering a cooling medium to the coil.

9. An air-conditioning system in accordance with claim 7 in which the means for delivering a heat transfer medium to the heat exchange coil comprises a heating means for delivering a heating medium to the coil.

10. An air-conditioning system in accordance with claim 7 in which the means for delivering a heat transfer medium to the heat exchange coil comprises a refrigeration system having a condenser and an evaporator, and selective distributing means for delivering the heat transfer medium in heat transfer relation with the condenser and coil and evaporator and coil, respectively.

11. An air-conditioning system in accordance with claim 10 in which the selective distributing means comprises a hot water pipe for delivering hot water from the condenser to the coil, a chilled water pipe for delivering chilled water from the evaporator to the coil, a valve for controlling the supply of hot and chilled water to the coil, and a common return line connecting the outlet from the heat exchange coil to both the condenser and evaporator for heat exchange therewith.

12. An air-conditioning system in accordance with claim 11 in which an air-conditioning unit is provided in the path of the air delivered to the central core area and having a heat transfer coil therein, the hot water pipe of the selective distributing means connects the heat exchange coil in the first and second air-conditioning units in parallel, the chilled water pipe connects the heat exchange coils in the first and second air-conditioning units in parallel, and a valve for each of the coils for controlling the flow of hot and chilled water thereto as required.

13. An air-conditioning system in accordance with claim 12 in which a water heater is connected in series with the condenser of the refrigeration system to supply hot water to the hot water pipe at the temperature and quantity required.

14. An air-conditioning system in accordance with claim 10 in which the space is a building having successive floors, a first air-conditioning unit is provided for each floor for air conditioning the peripheral area of the building and a second air-conditioning unit is provided common to all of the floors for supplying conditioned air to the inner core area, the hot and chilled water pipes extending through the plurality of floors and connected to supply hot and chilled heat exchange medium to each of the heat exchange coils, and a common return pipe connecting the heat exchange coils on the plurality of floors for return to the condenser and evaporator of the refrigeration system.

15. An air-conditioning system in accordance with claim 6 in which the vertical duct of the air-conditioning unit has a transverse wall to divide the duct into an upper chamber above the laterally extending duct and a lower chamber opening into said laterally extending horizontal duct, said heat exchange coil extending vertically between the bottom of the vertical duct and transverse wall to divide the lower chamber into a plenum space in front of the coil and a delivery chamber at the rear of the coil, and a fan in the vertical duct above the transverse wall for delivering air into the plenum chamber at the front of the heat transfer coil.

16. An air-conditioning system in accordance with claim 6 in which a wall extends transversely across the vertical duct, the fan being mounted on the transverse wall for delivering air downwardly through an opening in said wall, and the heat transfer coil extending horizontally across said vertical duct above the horizontal duct and having vertical fins.

References Cited in the file of this patent

UNITED STATES PATENTS

| | | |
|---|---|---|
| 1,583,060 | Lewis | May 4, 1926 |
| 1,719,659 | Hopkins | July 2, 1929 |
| 2,019,351 | Lathrop | Oct. 29, 1935 |
| 2,200,945 | Ashley | May 14, 1940 |
| 2,318,858 | Hornaday | May 11, 1943 |
| 2,355,495 | Zier | Aug. 8, 1944 |
| 2,819,023 | Marshall | Jan. 7, 1958 |
| 2,899,180 | Allander et al. | Aug. 11, 1959 |
| 3,089,649 | Curran | May 14, 1963 |